(12) United States Patent
Roty et al.

(10) Patent No.: US 9,592,705 B2
(45) Date of Patent: Mar. 14, 2017

(54) PNEUMATIC TIRE

(75) Inventors: Gael Roty, Ota (JP); Ludovic Greverie, Ota (JP); Jose Merino Lopez, Clermont-Ferrand (FR); Jean-Pierre Queslel, Clermont-Ferrand (FR); Bernard Villeneuve, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 561 days.

(21) Appl. No.: 14/114,526

(22) PCT Filed: Apr. 28, 2011

(86) PCT No.: PCT/JP2011/060393
§ 371 (c)(1),
(2), (4) Date: Oct. 28, 2013

(87) PCT Pub. No.: WO2012/147191
PCT Pub. Date: Nov. 1, 2012

(65) Prior Publication Data
US 2014/0048190 A1  Feb. 20, 2014

(51) Int. Cl.
*B60C 11/13* (2006.01)
*B60C 11/03* (2006.01)
*B60C 11/04* (2006.01)

(52) U.S. Cl.
CPC .......... *B60C 11/13* (2013.01); *B60C 11/0309* (2013.04); *B60C 11/1353* (2013.04);
(Continued)

(58) Field of Classification Search
CPC ... B60C 11/1369; B60C 11/13; B60C 11/042; B60C 11/047; B60C 2011/1338;
(Continued)

(56) References Cited

U.S. PATENT DOCUMENTS 6,119,744 A   9/2000 Tsukagoshi
7,537,033 B2 * 5/2009 Yamane ............... B60C 11/0309
                                              152/209.21

FOREIGN PATENT DOCUMENTS

JP   3276802      12/1991
JP   4221207 A    8/1992
(Continued)

OTHER PUBLICATIONS

English machine translation of JP05-155203, dated Jun. 1993.*
(Continued)

*Primary Examiner* — Justin Fischer
*Assistant Examiner* — Robert Dye
(74) *Attorney, Agent, or Firm* — Dickinson Wright PLLC

(57) ABSTRACT

Provided is a pneumatic tire capable of yielding excellent water-draining performance, while reducing air column resonance. This pneumatic tire (1) has a tread (3) and at least one ply (2) arranged toward the interior of the tread in the radial direction. The tread has at least one main channel (4) and a flexible fence (5) formed inside the main channel. The main channel has a bottom (413) and opposing first and second wall surfaces (411, 412). The flexible fence extends along the width of the main channel so as to block at least 70% of a cross sectional area of the main channel, and is arranged at intervals so that at least one is present in the main channel in the tread footprint when the tire rolls. A plurality of recesses having an opening that opens in the main channel are formed on the bottom, first wall surface and/or second wall surface of the main channel, the flexible fence being (Continued)

connected to the recess and extending into the main channel via the opening of the recess.

12 Claims, 4 Drawing Sheets

(52) U.S. Cl.
CPC ............ *B60C 11/04* (2013.01); *B60C 11/042* (2013.04); *B60C 2011/1338* (2013.04); *B60C 2011/1361* (2013.04)

(58) Field of Classification Search
CPC ....... B60C 2011/133; B60C 2011/1361; B60C 11/1353
See application file for complete search history.

(56) References Cited

FOREIGN PATENT DOCUMENTS

| | | | |
|---|---|---|---|
| JP | 05-155203 | * | 6/1993 |
| JP | 11105511 A | | 4/1999 |
| JP | 11-217007 | * | 8/1999 |
| JP | 2006035968 A | | 2/2006 |
| JP | 2006341655 A | | 12/2006 |
| JP | 200923505 A | | 2/2009 |

OTHER PUBLICATIONS

English machine translation of JP11-217007, dated Aug. 1999.*
Japanese Office Action on Application No. 201305118945 dated Apr. 8, 2015.

* cited by examiner

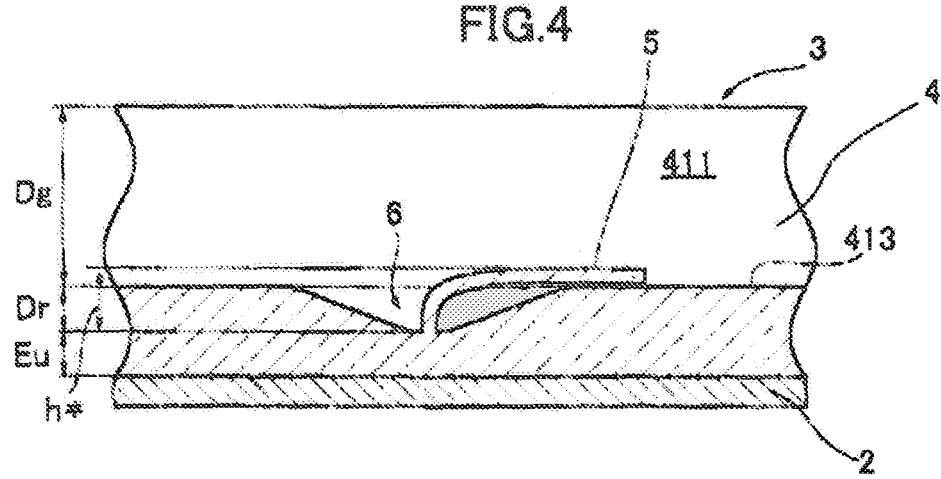
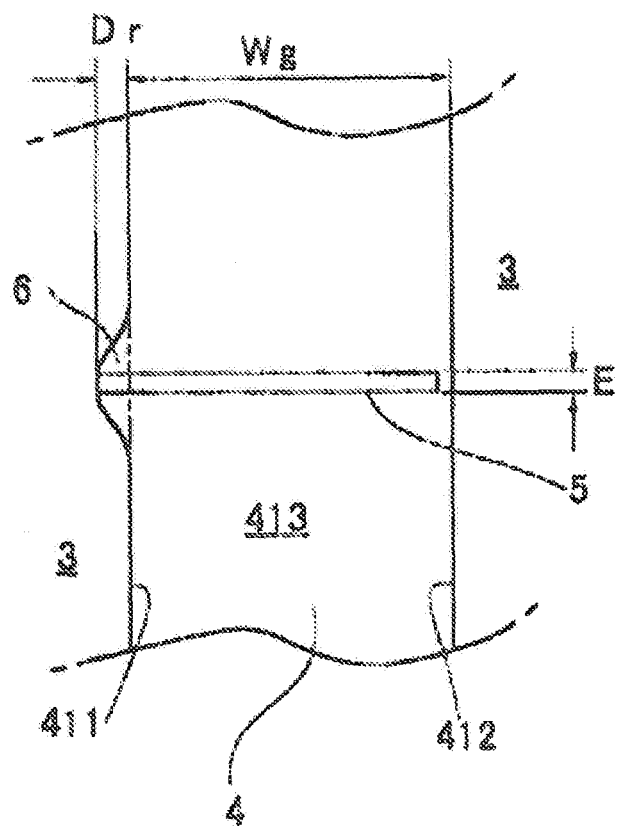

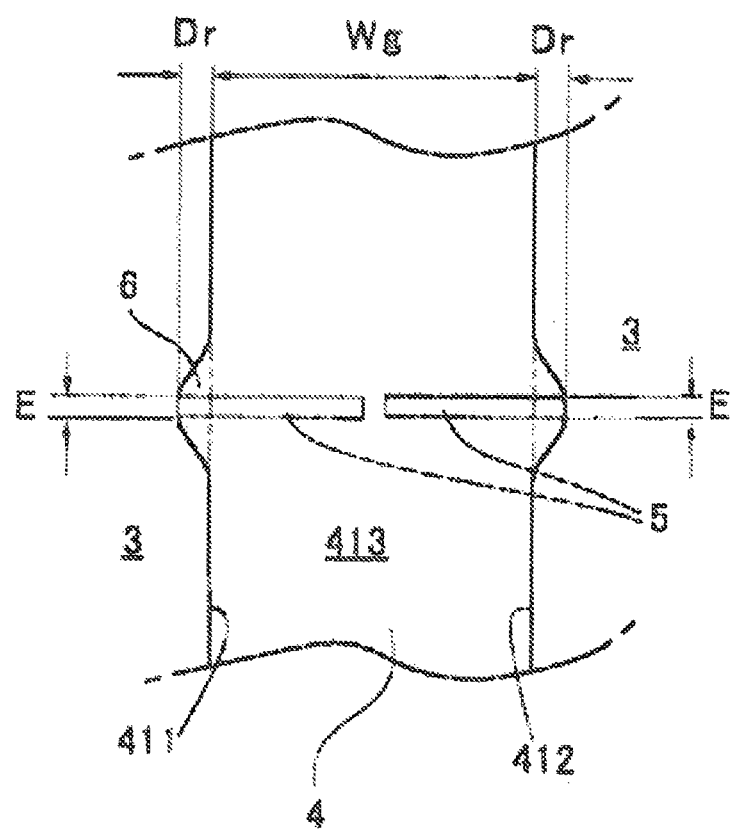

PNEUMATIC TIRE

This application claims benefit of the filing date of PCT/JP2011/060393, filed 28 Apr. 2011, the entire contents of which is incorporated herein by reference for all purposes.

BACKGROUND

Technical Field

The present disclosure relates to a pneumatic tire, and in particular relates to a pneumatic tire with which it is possible to obtain satisfactory drainage performance while reducing air column resonance sound by forming flexible fences in the main groove of the tread.

Background Art

Air column resonance sound in a main groove formed in a tire tread is generated as a result of resonance in a tube (air column) formed by the main groove and the road surface, and the resonant frequency thereof depends on the length of the air column formed between the main groove and the road surface.

This air column resonance sound manifests itself in the form of noise inside and outside the vehicle, and its peak is often at around 1 kHz, which readily reaches the human ear. As a technique for reducing the air column resonance sound of a main groove a technique is known whereby the air column resonance sound is reduced by interrupting the flow of air in the direction in which the main groove is formed, by providing so-called flexible fences, in other words protrusions, which extend from the bottom or the walls of the main groove, blocking all or most of the main groove. However, interrupting the flow of air in the direction in which the main groove is formed also interrupts the flow within the main groove of water that penetrates into the main groove when being driven on a wet road surface, and because there is a deterioration in the drainage characteristics of water interposed between the pneumatic tire and the road surface, handling stability on wet road surfaces deteriorates.

FIG. 4 of patent literature article 1 discloses a technique which achieves both drainage and a reduction in air column resonance sound by disposing within a main groove three groove fences 3 (flexible fences) spaced apart from each other and extending respectively from the groove bottom and from opposing groove walls within the groove.

Also, FIG. 3 of patent literature article 2 discloses a technique which achieves both drainage and a reduction in air column resonance sound by disposing separating walls 30 (flexible fences), which extend from the bottom of a main groove, in such a way that the greater part thereof, starting at the opening of the main groove, does not touch the groove walls.

PATENT LITERATURE

Patent literature article 1: Japanese Patent Kokai 1999-105511
Patent literature article 2: Japanese Patent Kokai 2006-341655

SUMMARY

Problems to be Resolved by Embodiments of the Invention

Here, the inventors found through experiment and analysis that when a so-called flexible fence is subjected to hydrostatic pressure and collapses, the root section thereof which is attached to the main groove does not bend significantly, but significant bending occurs in a section that is separated a certain distance in the height direction from the portion attached to the main groove, and the entire flexible fence collapses into the groove by virtue of the fact that the curvature, predominantly of this section, decreases. On the basis of such observations, there are problems in the techniques disclosed in the abovementioned patent literature article 1 and patent literature article 2 in that the groove fences 3 or separating walls 30 are formed in such a way that they extend from the groove bottom or the groove wall, and thus even in a state in which the flexible fence has collapsed, the root section of the flexible fence does not bend significantly and remains within the main groove, and thus the main groove is narrowed in its depth direction (if the flexible fence extends from the groove bottom) or in the groove width direction (if the flexible fence extends from the groove wall), and drainage of fluid in the main groove is correspondingly inhibited by this narrowing. Further, in particular if the flexible fence extends from the bottom of the main groove toward the tread footprint, there is a problem in that the height of the flexible fence decreases and the overall bending stiffness increases as wear of the flexible fence progresses, and thus the region of the root section discussed hereinabove which remains within the main groove increases as such wear progresses, and as a result, although reduction in air column resonance sound is sustained, drainage capability deteriorates as wear progresses.

Accordingly, embodiments of the present invention are intended to resolve the problems faced by the prior art described above, and with the object of providing a pneumatic tire with which it is possible to obtain satisfactory drainage performance while reducing air column resonance sound.

A further object is to provide a pneumatic tire with which it is possible for reduced air column resonance sound and satisfactory drainage performance to be sustained until the final stage of wear of the flexible fence.

Means of Overcoming the Problems

In order to achieve the abovementioned object, disclosed herein is an embodiment of a pneumatic tire having a tread which has at least one main groove comprising a bottom surface and opposing first and second wall surfaces and a plurality of flexible fences which have a thickness E and are formed within at least one of the main grooves, and at least one ply which is disposed radially inward of the tread and which extends in the circumferential direction of the tire, the plurality of flexible fences extend within the main groove so as to interrupt at least 70% of the cross-sectional area of the main groove and are disposed with a spacing such that at least one thereof is present within the main groove within a tread footprint when the tire is rolling, characterised in that a plurality of recessed portions having an opening which opens in the main groove are formed in the bottom surface, the first wall surface and/or the second wall surface of the main groove, and in that the plurality of flexible fences are connected respectively to the plurality of recessed portions and extend into the main groove through the openings of the recessed portions.

In the tire configured in this way, flexible fences which are formed within the main groove, which block at least 70% of the cross-sectional area of the main groove, and which are disposed with a spacing such that at least one thereof is present within the main groove within a tread footprint when the tire is rolling, it makes easier for the peak of the air column resonance sound to be shifted away from the frequency band which readily reaches the human ear by changing the length of an air column formed between the main groove and the road surface relative to a case in which flexible fences are not formed, and as a result noise due to the air column resonance sound is ameliorated.

Further, in the disclosed configuration, recessed portions are formed in the bottom surface, the first wall surface and/or the second wall surface of the main groove and the flexible fences are connected to the recessed portions, and thus the drainage characteristics of the main groove when the flexible fences have collapsed as a result of the water pressure of water that has penetrated into the main groove can be more reliably maintained. More specifically, the location at which the flexible fence is connected to the main groove can be set to a location that is deeper than the bottom surface, the first wall surface and/or the second wall surface of the main groove, and therefore by arranging that a root section of the flexible fence corresponding to said depth does not remain within the main groove, it is possible to suppress narrowing of the main groove in the height direction of the groove and/or the width direction of the groove.

Further, in particular if the recessed portion to which the flexible fence is connected is formed in the bottom surface of the main groove and the flexible fence extends toward the tread footprint, the height of the flexible fence can be maintained even at the final stage of wear, by an amount corresponding to the amount by which the location at which the flexible fence is connected to the main groove has been made deeper than the bottom surface of the main groove, and thus deterioration in drainage capability concomitant with wear of the flexible fence can be suppressed more reliably.

Here, 'groove' refers to a space having a width and a depth and configured by connecting two opposing surfaces (wall surfaces) which under normal usage conditions do not come into contact with each other, by means of another surface (a bottom surface).

Also, 'main groove' refers to a groove that is predominantly responsible for draining fluids and is relatively wide among the various grooves that are formed in the tread. In many cases 'main groove' means a groove which extends in the circumferential direction of the tire in a linear, zigzag or undulating fashion, but relatively wide grooves which extend at an angle to the direction of rotation of the tire and are predominantly responsible for drainage of fluids are also included.

Also, 'recessed portion' refers to a section that is provided in a wall (opposing wall surfaces, bottom surface) constituting the groove, in a direction of increasing depth or width of the groove. The recessed portion opens in the surface constituting the groove, and it further has two edge portions which adjoin the surface constituting the groove in locations that are separated in the direction in which the groove extends. Following the direction in which the groove extends, in the location in which the recessed portion is formed, the depth or width of the groove begins to increase from one edge portion and returns to the original depth or width at the other edge portion. The recessed portion has a maximum depth measured in a direction perpendicular to the surface (opposing wall surfaces, bottom surface) in which the recessed portion is formed.

Further, 'ply' refers to a layer of material such as nylon, polyester or steel coated with a rubber material and extending in the direction of rotation of the tire, radially inward of the tire tread.

Further, 'tread footprint' refers to a surface region of the tread that is in contact with the road surface when the tire is mounted on an applicable rim as defined in the industrial standards mentioned below, is inflated to its nominal pressure and a nominal load is applied.

Further, 'standards' are those that are defined by industrial standards that are valid in the region in which the tire is manufactured or used. Examples of industrial standards are: in Europe, the ETRTO (The European Tire and Rim Technical Organisation) "Standards Manual"; in the USA, the TRA (the Tire and Rim Association, Inc.) "Year Book"; and in Japan, the Japan Automobile Tire Manufacturers Association (JATMA) "JATMA Year Book". Further, 'applicable rim' refers to a rim prescribed in these standards according to the size of the tire, 'nominal pressure' refers to the air pressure prescribed in these standards corresponding to the load-carrying capacity, and 'nominal load' refers to the maximum mass with which the tire is permitted to be loaded according to these standards.

In embodiments of the present invention, the flexible fence is preferably connected to the recessed portion in a location that is a depth of at least equal to 1.0 mm from the opening of the recessed portion.

In the embodiments of the present invention configured in this way, it is possible to arrange that when the flexible fence collapses due to hydrostatic pressure, the section thereof that bends significantly is located at a height that is equivalent to that of the bottom surface or the wall surface constituting the main groove, or is located lower than the bottom surface or the wall surface constituting the main groove. Therefore the cross-sectional area of the main groove can be more reliably maintained in the event that collapsing due to hydrostatic pressure occurs, and as a result drainage characteristics can be more reliably maintained.

In embodiments of the present invention, preferably the openings of the recessed portions each have edge portions extending in the width direction of the main groove at locations that are separated in the direction in which the main groove extends, and in the direction in which the main groove extends, a distance Lhrt from the flexible fence to at least one edge portion from among the edge portions of the opening is at least equal to 1.25 mm and is at most equal to 120% of a height h of the flexible fence when new.

In embodiments of the present invention configured in this way, drainage characteristics can be maintained by maintaining a region into which the flexible fence can collapse such that when the flexible fence collapses due to hydrostatic pressure, the section thereof that bends significantly is located within the recessed portion, and by not opening the recessed portion more than necessary, durability of the tread can be maintained. Here, if the distance Lhrt is smaller than 1.25 mm then it becomes difficult for the flexible fence to collapse sufficiently and drainage characteristics deteriorate. On the other hand, if the distance Lhrt is larger than 120% of the height h of the flexible fence when new, then if the recessed portion is formed in the bottom surface of the main groove, the region in which the wall thickness, in the radial direction of the tire, from the bottom surface of the main groove to the ply is reduced becomes larger and the durability of the tread deteriorates, and further if the recessed portion is formed in the wall surface of the main groove, the region in which the ground contact area of the tread is reduced becomes larger, and thus various types of performance normally required of a tire deteriorate.

In embodiments of the present invention, preferably a bottom portion having a length Lrb in the direction in which the main groove extends and a maximum depth Dr is formed in the deepest location in the recessed portion, the opening of the recessed portion has a length Lrt in the direction in which the main groove extends, and the length Lrb of the bottom portion of the recessed portion is shorter than the length Lrt of the opening of the recessed portion.

In embodiments of the present invention configured in this way, if the recessed portion is formed in the bottom surface of the main groove, durability of the tread can be maintained by reducing the extent of the section in which the distance from the maximum depth in the recessed portion to the ply in the radial direction of the tire is reduced, and further if the recessed portion is formed in the wall surface of the main groove, various types of performance normally required of a tire are maintained by further reducing the degree to which the ground contact area of the tread is reduced due to the formation of the recessed portion.

In embodiments of the present invention, preferably the flexible fence is connected to the bottom portion of the recessed portion and the maximum depth Dr of the bottom portion is at least equal to 1.0 mm.

In embodiments of the present invention configured in this way, it is possible to arrange that when the flexible fence collapses due to hydrostatic pressure, the section thereof that bends significantly is more reliably located at a height that is equivalent to that of the bottom surface or the wall surface of the main groove, or located lower than the bottom surface or the wall surface of the main groove.

In embodiments of the present invention, the flexible fence is preferably connected at the deepest location in the recessed portion.

In embodiments of the present invention configured in this way, flexible fences can be provided making maximum use of the depth of the recessed portions, and drainage characteristics can be maintained more reliably while achieving a reduction in the air column resonance sound.

Here, 'the deepest location in the recessed portion' refers to the location at which the depth of the recessed portion in a direction perpendicular to the bottom surface or the wall surface in which the recessed portion is provided is maximal, the maximum depth of the recessed portion being measured at this deepest location in the recessed portion.

In embodiments of the present invention, preferably the recessed portion is formed in the bottom surface of the main groove, and the flexible fence is connected to the recessed portion.

In embodiments of the present invention configured in this way, the direction in which the tire is stripped from the mold during manufacture is the same as the direction in which the flexible fence extends, and thus the productivity of such a tire is excellent.

In embodiments of the present invention, preferably the openings of the recessed portions each have edge portions extending in the width direction of the main groove at locations that are separated in the direction in which the main groove extends, and the distance Lrt between the edge portions of the opening in the direction in which the main groove extends is at least equal to 2.5 mm and is at most equal to 240% of the height h of the flexible fence when new.

In embodiments of the present invention configured in this way, it is easier to maintain effectively the region into which the flexible fence can collapse, without causing the recessed portion to be open more than necessary, and by this means it is possible to maintain the drainage characteristics and to maintain the durability of the tread.

In embodiments of the present invention, more preferably the length of the interval, measured in the radial direction of the tire, between the deepest location in the recessed portion and a radially outer surface of the outermost ply, in the radial direction of the tire, is at least equal to 1.0 mm.

In embodiments of the present invention configured in this way, by maintaining the thickness of the groove bottom portion it is possible to inhibit deterioration in the durability of the tread due to a reduction in the thickness of the groove bottom portion resulting from the formation of the recessed portion.

Here, 'the thickness of the groove bottom portion' refers to the thickness, measured in the radial direction of the tire, from a void that is furthest to the inside of the tread in the radial direction of the tire (for example the bottom surface of the main groove) to the radially outer surface of the radially outermost ply.

In embodiments of the present invention, preferably the recessed portion is formed in one of the first and second wall surfaces of the main groove, and the flexible fence is connected to the recessed portion formed in the one wall surface.

In embodiments of the present invention configured in this way, there is little variation in the bending stiffness of the flexible fence due to wear of the tread, and thus drainage characteristics can be maintained more reliably over an extended period of time while achieving a reduction in the air column resonance sound.

In embodiments of the present invention, preferably recessed portions are formed in substantially opposing locations on the first and second wall surfaces of the main groove, the flexible fence is formed by means of two half fences, and these half fences are connected respectively to the recessed portions formed in the substantially opposing locations.

In embodiments of the present invention configured in this way, there is little variation in the bending stiffness of each half fence due to wear of the tread, and thus drainage characteristics can be maintained more reliably over an extended period of time while achieving a reduction in the air column resonance sound. Also, the bending stiffness of the half fences is relatively higher than that of a flexible fence configured in such a way that the main groove is blocked using a single fence, and therefore the side surfaces on the tread footprint sides of the half fences can be made to wear more uniformly.

Here, 'half fence' refers to a flexible fence the length of which in the width direction of the main groove has been reduced approximately to substantially half of the main groove. Provided that the function as a flexible fence is not impaired, the two half fences may be asymmetrically shaped, or there may be a void or an overlap between the two half fences.

In embodiments of the present invention, preferably the thickness E of the flexible fence is at least equal to 0.3 mm and at most equal to 1.0 mm.

In embodiments of the present invention configured in this way, drainage characteristics can be maintained more reliably while achieving a reduction in the air column resonance sound. To elaborate, if the thickness of the flexible fence is less than 0.3 mm there is a danger that the reduced dimensional stiffness of the flexible fence will allow the flexible fence to collapse even under the pressure of air, and thus the effect of reducing the air column resonance sound will decrease. On the other hand, if the thickness of the flexible fence is more than 1.0 mm there is a danger that the proportion of the cross section of the main groove that is open when the flexible fence has collapsed into the main groove will become smaller, causing a deterioration in the drainage characteristics.

Advantages of the Invention

When the pneumatic tire tread according to the embodiments of the present invention is employed, satisfactory drainage performance can be maintained while the air column resonance sound is reduced.

BRIEF EXPLANATION OF THE FIGURES

FIG. 4 is a diagram which illustrates, similarly to FIG. 2, an enlarged sectional view of the tread portion of a pneumatic tire as viewed along line II-II in FIG. 1, illustrating schematically a state in which the tire is being driven on a wet road surface.

FIG. 5 is a diagram illustrating schematically a tread portion of a pneumatic tire according to a second mode of embodiment of the present invention.

FIG. 6 is a diagram illustrating schematically a tread portion of a pneumatic tire according to a third embodiment of the present invention.

DESCRIPTION OF SPECIFIC EMBODIMENTS

Preferred modes of embodiment of the present invention will now be described with reference to the diagrams.

First, a pneumatic tire according to a first mode of embodiment of the present invention will be described based on FIG. 1 to FIG. 3.

Figure 1:
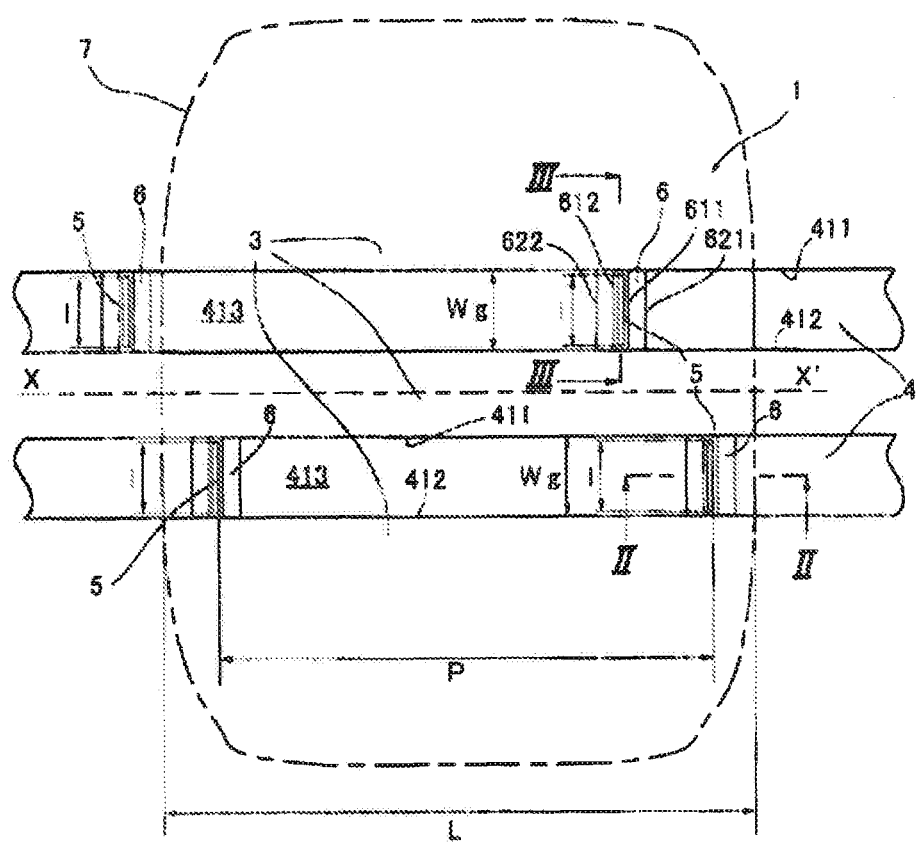
FIG. 1 is a diagram illustrating schematically a tread portion of a pneumatic tire according to a first mode of embodiment of the present invention.
Figure 2:
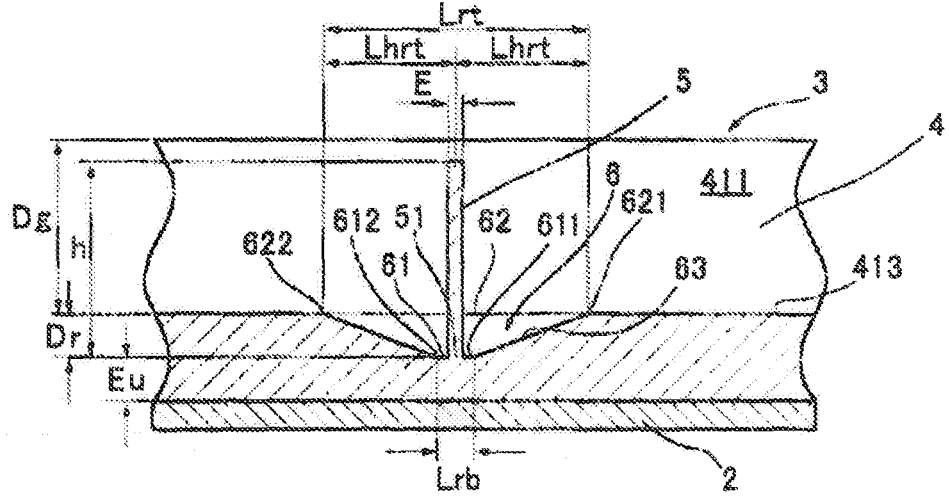
FIG. 2 is an enlarged sectional view of the tread portion of a pneumatic tire as viewed along line II-II in FIG. 1.
Figure 3:
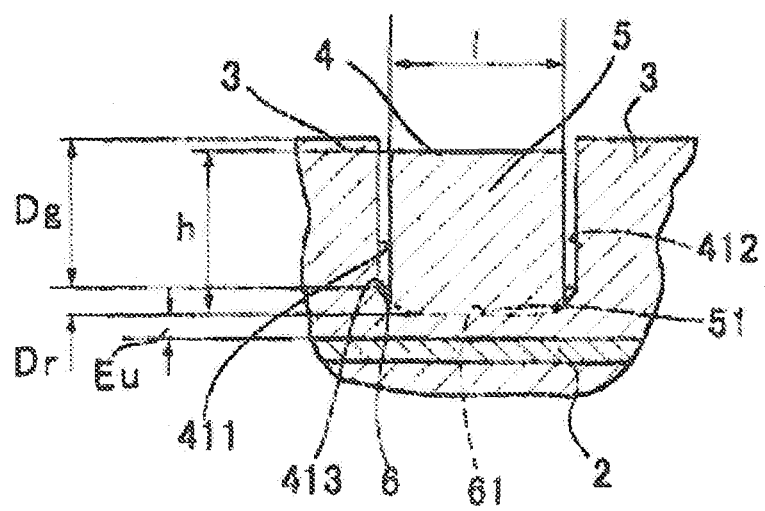
FIG. 3 is an enlarged sectional view of the tread portion of a pneumatic tire as viewed along line III-III in FIG. 1.

FIG. 1 is a diagram illustrating schematically a tread portion of a pneumatic tire according to a first mode of embodiment of the present invention, FIG. 2 is an enlarged sectional view of the tread portion of a pneumatic tire as viewed along line II-II in FIG. 1, and FIG. 3 is an enlarged sectional view of the tread portion of a pneumatic tire as viewed along line III-III in FIG. 1.

First, as shown in FIG. 1, reference code 1 indicates a pneumatic tire 1 according to the present embodiment, the pneumatic tire 1 having a tread portion 3, and two main grooves 4 having a width Wg and extending in the circumferential direction of the tire as indicated by XX' are formed in the tread portion 3. The main grooves 4 have three surfaces, namely opposing wall surfaces 411, 412 and a bottom surface 413. It should be noted that the size of the tire in this example is 225/55R16, and the direction of rotation of the tire tread portion 3 is not prescribed. In the present mode of embodiment, the opposing wall surfaces 411, 412 each extend perpendicular to the radial direction of the tire, and the width Wg of the main grooves is 14.5 mm.

The drawing depicts the tread footprint 7 and the tread footprint length L when the tire is inflated to its nominal pressure and a nominal load is applied. It should be noted that according to the 'ETRTO Standard Manual 2011' the applicable rim for this size is 7J, the nominal pressure is 250 kPa, and the nominal load is 690 kg, and in the present embodiment the footprint length L is 143 mm.

Here, when the tire is rolling, air columns are formed between the road surface and each of the main grooves 4 which pass through the tread footprint 7, and the resonant frequency of the main grooves 4 depends on the length of the air column formed in this way. In the present mode of embodiment, flexible fences 5 are provided within the main grooves 4, as illustrated in FIG. 1 to FIG. 3, in order to change the frequency of the air column resonance sound by changing the length of the air column. As illustrated in FIG. 1 to FIG. 3, a plurality of recessed portions 6 is formed in each main groove 4, and flexible fences 5 capable of significantly blocking the main grooves 4 are formed respectively in the recessed portions 6. As illustrated in FIG. 1, an installation spacing P between flexible fences 5 formed in the same main groove 4 is set so as to be a spacing that is shorter than the footprint length L, so that at least one flexible fence is always present within the footprint 7 in each main groove 4 when the tire is rolling.

The configuration of the recessed portions 6 will now be described.

As illustrated in FIG. 2 and FIG. 3, the recessed portion 6 is formed in the bottom surface 413 of the main groove 4. The recessed portion 6 has a maximum depth Dr in a direction perpendicular to the bottom surface 413, and a bottom portion 61 which serves as a connecting portion for a flexible fence 5 which is discussed hereinafter is formed at the location of the maximum depth Dr. The bottom portion 61 is provided at both sides in the direction in which the main groove 4 extends (hereinafter referred to as 'longitudinal direction of the main groove 4') with edge portions 611, 612 which each extend linearly in the width direction of the main groove 4. Further, the recessed portion 6 has an opening 62 which opens into the main groove 4 at the bottom surface 413 of the main groove 4, and inclined portions 63. The opening 62 is provided, at both sides in the longitudinal direction of the main groove 4, with edge portions 621, 622 which each extend linearly in the width direction of the main groove 4, and the inclined portions 63 extend obliquely so as to connect the edge portions 611, 612 of the bottom portion 61 and the edge portions 621, 622 of the opening 62. The bottom portion 61 is formed in such a way that it is located in the middle, in the longitudinal direction of the main groove 4, of the recessed portion 6. It should be noted that the edge portions 621, 622 of the opening 62 and the edge portions 611, 612 of the bottom portion 61 may also be formed in such a way that they extend in a curved fashion in the width direction of the main groove 4, for example in the shape of a circular arc, when viewed in the radial direction of the tire.

As illustrated in FIG. 2, the opening 62 opens in a bottom portion 43 of the main groove 4 from one of its edge portions 621 to the other edge portion 622 over a length Lrt in the longitudinal direction of the main groove 4, and the bottom portion 61 extends parallel to the bottom surface 413 of the main groove 4, extending from one of its edge portions 612 to the other edge portion 611 over a length Lrb. The bottom portion 61 is formed in such a way that in the radial direction of the tire it has a thickness Eu relative to the outermost surface in the radial direction of the tire, of the outermost ply 2 in the radial direction of the tire. In other words, a thickness Eu is maintained as the wall thickness between the location of the bottom portion 61 in the radial direction of the tire and the location of the outermost surface, in the radial direction of the tire, of the outermost ply 2, in the radial direction of the tire.

The configuration of the flexible fences 5 will now be described.

The flexible fence 5 has a base portion 51 that is connected to the recessed portion 6, and as illustrated in FIG. 2 is provided in such a way that a base portion 51 thereof is connected to the bottom portion 61 and the flexible fence 5 extends in the radial direction of the tire (a direction perpendicular to the axis of rotation of the tire).

Further, as illustrated in FIG. 3, the flexible fence 5 is provided in such a way that there are gaps of a size such that the flexible fence 5 is not inhibited from collapsing, between both of its side surfaces and the opposing wall surfaces 411, 412 of the main groove 4 over substantially its entire height, except for sections on both sides in the width direction of the base portion 51.

As illustrated in FIG. 1, each flexible fence 5 is formed in such a way that it extends in a direction perpendicular to the longitudinal direction of the main groove 4 (the width direction of the main groove 4). Further, as illustrated in FIG. 1, each flexible fence 5 is formed in such a way that its cross-sectional shape in the circumferential direction of the tire is rectangular, and over the height of the flexible fence 5 (in the radial direction of the tire) the rectangular cross section has the width I (see FIG. 3) and thickness E (see FIG. 2) discussed hereinabove.

Further, as illustrated in FIG. 3, the flexible fence 5 is formed with a rectangular shape, matching the cross-sectional shape of the main groove 4, as viewed in the longitudinal direction of the main groove 4 (front view), and as illustrated in FIG. 2 and FIG. 3 it has a height h that is slightly lower than the total depth of the depth Dg of the main groove 4 and the maximum depth Dr of the recessed portion 6.

The flexible fence 5 is formed in such a way that it blocks at least 70% of the cross-sectional area of the main groove 4 (the cross-sectional area of the opening of the main groove 4 as viewed in the longitudinal direction of the main groove 4), and is formed in such a way that it collapses under the water pressure of liquids such as predominantly water that flow within the main groove 4. In the present mode of embodiment, the depth Dg of the main groove 4 is 8.0 mm, the maximum depth Dr of the recessed portion 6 is 1.2 mm, the height h of the flexible fence 5 is 8.2 mm, its width I is 13.5 mm and its thickness E is 0.6 mm, and the flexible fence 5 blocks approximately 87% of the cross-sectional area of the main groove 4.

It should be noted that for example in the case of the tire in the present mode of embodiment the flexible fence 5 may be of a rectangular shape having a height h of approximately 6.8 mm or more, such that it blocks at least 70% of the cross-sectional area of the main groove 4. It should be noted that without limitation to the present mode of embodiment, if the width Wg and the depth Dg of the tire main groove 4 and the maximum depth Dr of the recessed portion 6 change, the width I and height h of the flexible fence 5 should be modified accordingly such that it blocks at least 70% of the cross-sectional area of the main groove 4.

In the present mode of embodiment, the flexible fence 5 consists of the same material as the tread portion 3. It should be noted that the flexible fence 5 may consist of a different material to the tread portion 3.

The shape and dimensions of the recessed portion 6 and the disposition of the flexible fences 5 will now be described.

In the present mode of embodiment, the maximum depth Dr of the recessed portion 6 is 1.2 mm, the length Lrt of the opening 62 of the recessed portion 6 is 7.2 mm and the length Lrb of the bottom portion 61 of the recessed portion 6 is 2.0 mm, and the opening 62 and the bottom portion 61 of the recessed portion 6 are connected linearly by means of an inclined portion 63.

It should be noted that the maximum depth Dr of the bottom portion 51 to which such a flexible fence 5 is connected is preferably at least equal to 1.0 mm. Further, the flexible fence 5 may be connected to the recessed portion 6 in a location that is not at the maximum depth Dr, provided that it is a location that is at a depth of at least equal to 1.0 mm.

Further, the recessed portion 6 is formed in such a way that the deepest location in the recessed portion 6 is a thickness Eu from the radially outer surface of the outermost ply, in the radial direction of the tire, such that deterioration in durability due to the reduction in the thickness of the groove bottom portion of the main groove 4 (in the present mode of embodiment, the section having a thickness Dr+Eu illustrated in FIG. 2) as a result of the provision of the recessed portion 6 can be suppressed. In the present mode of embodiment, the thickness Eu is 1.2 mm. In this way, from the viewpoint of tire durability it is preferable to reduce the sections in which the wall thickness in the radial direction of the tire between the bottom surface of the main groove and the ply is reduced due to the provision of the recessed portion.

As illustrated in FIG. 2, in the present mode of embodiment the cross-sectional shape of the recessed portion 6 (the cross-sectional shape in the longitudinal direction of the main groove 4) is such that the opening 62 and the bottom portion 61 are connected linearly, and are connected in such a way that they are symmetrical in relation to the longitudinal direction of the main groove 4. More specifically, in the present mode of embodiment the bottom portion 61 is provided linearly, the edge portions 611, 612 thereof are connected to the edge portions 621, 622 of the opening 62 by means of inclined portions 63, and the inclined portions 63 are formed symmetrically. It should be noted that the cross-sectional shape of the inclined portions 63 may take the form of another shape that does not interfere with the collapsing of the flexible fence 5 that is connected to the bottom portion 61, for example the shape of a circular arc or spline, or a combination of straight lines and circular arcs, and the cross-sectional shape of the recessed portion 6 may be asymmetrical, provided that it does not interfere with the collapsing of the flexible fence 5 that is connected to the recessed portion 6. Also, the length Lrb of the bottom portion may be set such that it is effectively zero, and in this case the overall cross-sectional shape of the recessed portion 6 may for example be formed in the shape of a circular arc.

Further, as illustrated in FIG. 2, the minimum distances Lhrt between a midline in the thickness E direction of the flexible fence 5, in the longitudinal direction of the main groove 4, and the edge portions 621, 622 of the opening 62 are both 3.6 mm. It should be noted that unlike in the present mode of embodiment, if the direction of rotation of the tire 1 is prescribed, then it is expected that the direction in which the flexible fence 5 collapses is also a fixed direction, and thus the recessed portion 6 may be formed having an asymmetrical cross-sectional shape, maintaining the distance Lhrt discussed hereinabove on only the side to which the flexible fence 5 is expected to collapse. It should be noted that if for example the edge portions 621, 622 are in the shape of circular arcs that bulge outward in the longitudinal direction of the main groove 4 relative to the flexible fence 5 when viewed in the radial direction of the tire, the minimum distance Lhrt discussed hereinabove is set as the distance between the midline of the flexible fence 5 in the thickness E direction and the end portion of either of the circular arc-shaped edge portions 621, 622, and if they are in the shape of circular arcs that bulge inward in the longitudinal direction of the main groove 4 relative to the flexible fence 5 when viewed in the radial direction of the tire, this distance is set as the distance between the midline of the flexible fence 5 in the thickness E direction and the location at which the circular arc-shaped edge portions 621, 622 bulge to the flexible fence 5 side to the greatest extent.

Next, the condition when a pneumatic tire according to the first mode of embodiment of the present invention is being driven on a wet road surface will be described with reference to FIG. 4.

FIG. 4 is an enlarged sectional view illustrating a condition in which the tread for a pneumatic tire is being driven on a wet road surface, as viewed along line II-II in FIG. 1.

As illustrated in FIG. 4, the flexible fence 5 connected to the recessed portion 6 collapses or bends under the water pressure generated by liquids such as predominantly water flowing through the main groove 4 when being driven on a wet road surface, and as a result the height thereof which protrudes into the main groove 4 is reduced to h*, the main part of the main groove is released as a result of the reduction in this protruding height, and drainage characteristics are maintained. In the present mode of embodiment in which the recessed portion 6 and the flexible fence 5 have the configuration discussed hereinabove, the section of the flexible fence 5 which bends the most occurs within the recessed portion 6, and occlusion of the main groove 4 by the flexible fence 5 corresponds essentially to only the thickness E of the flexible fence 5, the main groove can be released to a greater extent than in a case in which the flexible fence extends from the bottom surface of the main groove, and thus drainage characteristics are maintained to a greater degree.

Further, if as in the present mode of embodiment a recessed portion 6 is provided in the bottom surface 413 of the main groove 4 and a flexible fence 5 is connected to the recessed portion 6, then even if the flexible fence 5 is subjected to wear due to wear of the tire, resulting in an increase in the bending stiffness of the flexible fence 5, the bending stiffness of the flexible fence 5 will be relatively lower than in a case in which the groove depth Dg is the same as in the present mode of embodiment and the flexible fence extends from the bottom surface of the main groove, by virtue of the fact that the flexible fence 5 is caused to extend from a relatively lower location by providing the recessed portion 6, and thus drainage performance is sustained until the final stage of wear.

The main operational advantages of a pneumatic tire according to the first mode of embodiment of the present invention will now be described.

First, in the present mode of embodiment, flexible fences 5 which are formed within the main groove 4, which block at least 70% of the cross-sectional area of the main groove 4, and which are disposed with a spacing P such that at least one thereof is present within the main groove 4 within a tread footprint 7 when the tire is rolling, it makes easier for the peak of the air column resonance sound to be shifted away from the frequency band which readily reaches the human ear by changing the length of an air column formed between the main groove 4 and the road surface relative to a case in which flexible fences are not formed, and as a result noise due to the air column resonance sound is ameliorated.

Further, the configuration is such that recessed portions 6 are formed in the bottom surface 413 of the main groove 4 and flexible fences 5 are connected to the recessed portions 6, and thus the drainage characteristics of the main groove 4 when the flexible fences 5 have collapsed as a result of the water pressure of water that has penetrated into the main groove 4 can be more reliably maintained. More specifically, the location at which the flexible fence 5 is connected to the main groove 4 can be set to a location that is deeper than the bottom surface 413 of the main groove 4, and therefore by arranging that a root section of the flexible fence 5 corresponding to said depth does not remain within the main groove 4, it is possible to suppress narrowing of the main groove in the height direction of the groove. Further, in particular the height of the flexible fence 5 can be maintained even at the final stage of wear, by an amount corresponding to the amount by which the location at which the flexible fence 5 is connected to the main groove 4 has been deepened relative to the bottom surface 413 of the main groove 4, and thus deterioration in drainage capability concomitant with wear of the flexible fence 5 can be suppressed more reliably.

Further, because the flexible fence 5 is connected to the recessed portion 6 in a location that is a depth of at least equal to 1.0 mm from the opening 62 of the recessed portion 6, it is possible to arrange that when the flexible fence 5 collapses due to hydrostatic pressure, the section thereof that bends significantly is located at a height that is equivalent to that of the bottom surface 413 of the main groove 4, or is located lower than the bottom surface 413 of the main groove 4. Therefore the cross-sectional area of the main groove 4 can be more reliably maintained in the event that collapsing due to hydrostatic pressure occurs, even when flexible fences 5 have been provided, and as a result drainage characteristics can be more reliably maintained. It should be noted that if the maximum depth of the recessed portion 6 is less than 1.0 mm then in the event that collapsing due to hydrostatic pressure occurs, there is an increased risk that the section of the flexible fence 5 that bends significantly will occur in a location that is higher than the bottom surface 413 of the main groove 4, and it will be difficult to maintain drainage characteristics at a high level.

Further, in the longitudinal direction of the main groove 4, the distance Lhrt from the flexible fence 5 to at least one edge portion (621 and/or 622) from among the edge portions 621, 622 of the opening 62 is at least equal to 1.25 mm and is at most equal to 120% of the height h of the flexible fence 5 when new, and therefore drainage characteristics can be maintained while a reduction in the air column resonance sound is achieved, by maintaining a region into which the flexible fence 5 can collapse, by arranging that when the flexible fence 5 collapses due to hydrostatic pressure, the section thereof that bends significantly is located within the recessed portion 6 between the location at which the flexible fence 5 is connected to the recessed portion 6 and the edge portion 621, 622 of the opening 62, and further, by not opening the recessed portion 6 more than necessary, durability of the tread 3 can be maintained. Here, if the distance Lhrt is smaller than 1.25 mm then it becomes difficult for the flexible fence 5 to collapse sufficiently and drainage characteristics deteriorate. On the other hand, if the distance Lhrt is larger than 120% of the height h of the flexible fence 5 when new then the region in which the wall thickness, in the radial direction of the tire, from the bottom surface 413 of the main groove 4 to the ply 2 is reduced becomes larger and the durability of the tread 3 deteriorates. Therefore, by arranging that in the longitudinal direction of the main groove 4, the distance Lhrt from the flexible fence 5 to at least one edge portion from among the edge portions 621, 622 of the opening 62 is at least equal to 1.25 mm and is at most equal to 120% of the height h of the flexible fence 5 when new, it is possible to maintain drainage characteristics and to sustain the durability and various types of performance of the tire 1 while achieving a reduction in the air column resonance sound.

Further, because the length Lrb of the bottom portion of the recessed portion 6 is shorter than the length Lrt of the opening, durability of the tread 3 can be maintained by reducing the extent of the section in which the distance from the location of maximum depth in the recessed portion 6 to the ply 2 in the radial direction of the tire is reduced.

Further, because the flexible fence 5 is connected to the bottom portion 61 of the recessed portion 6 and the maximum depth Dr thereof is at least equal to 1.0 mm, it is possible to arrange that when the flexible fence 5 collapses due to hydrostatic pressure, the section thereof that bends significantly is more reliably located at a height that is equivalent to that of the bottom surface 413 of the main groove 4, or located lower than the bottom surface 413 of the main groove 4.

Further, because the flexible fence 5 is connected to the deepest location in the recessed portion 6, the flexible fence 5 can be provided making maximum use of the depth of the recessed portion 6, and drainage characteristics can be maintained more reliably while achieving a reduction in the air column resonance sound.

Further, because the recessed portion 6 is formed in the bottom surface 413 of the main groove 4 and the flexible fence 5 is connected to the recessed portion 6, the direction in which the tire 1 is stripped from the mold during manufacture is the same as the direction in which the flexible fence 5 extends, and thus the productivity of such a tire 1 is excellent.

Further, because the openings 62 of the recessed portions 6 each have edge portions 621, 622 extending in the width direction of the main groove 4 at locations that are separated in the longitudinal direction of the main groove 4, and in the longitudinal direction of the main groove 4 the distance Lrt between the edge portions 621, 622 is at least equal to 2.5 mm and is at most equal to 240 of the height h of the flexible fence 5 when new, it is easier to maintain effectively the region into which the flexible fence 5 can collapse, as discussed hereinabove, without causing the recessed portion 6 to be open more than necessary, and by this means it is possible to maintain the drainage characteristics and to maintain the durability of the tread 3.

Further, because the length of the interval, measured in the radial direction of the tire, between the deepest location in the recessed portion 6 and the radially outer surface of the outermost ply 2, in the radial direction of the tire, is at least equal to 1.0 mm, by maintaining the thickness of the groove bottom portion it is possible to inhibit deterioration in the durability of the tread 3 due to a reduction in the thickness of the groove bottom portion resulting from the formation of the recessed portion 6.

Further, because the thickness E of the flexible fence 5 is at least equal to 0.3 mm and at most equal to 1.0 mm, drainage characteristics can be maintained more reliably while achieving a reduction in the air column resonance sound. To elaborate, if the thickness of the flexible fence 5 is less than 0.3 mm there is a danger that the reduced dimensional stiffness of the flexible fence 5 will allow the flexible fence 5 to collapse even under the pressure of air, and thus the effect of reducing the air column resonance sound will decrease. On the other hand, if the thickness of the flexible fence 5 is more than 1.0 mm there is a danger that the proportion of the cross section of the main groove 4 that is open when the flexible fence 5 has collapsed into the main groove 4 will become smaller, causing a deterioration in the drainage characteristics. Therefore, if the thickness of the flexible fence is at least equal to 0.3 mm and at most equal to 1.0 mm, a reduction in the air column resonance sound is achieved.

A pneumatic tire according to a second mode of embodiment of the present invention will now be described based on FIG. 5.

FIG. 5 is a diagram illustrating schematically a tread portion of a pneumatic tire according to a second mode of embodiment of the present invention. The essential configuration of the recessed portion 6 and the flexible fence 5 in the present mode of embodiment, for example the shape and dimensions thereof, is similar to that in the first mode of embodiment discussed hereinabove, and the description here will mainly relate to aspects of the configuration that differ from the first mode of embodiment discussed hereinabove.

As illustrated in FIG. 5, a main groove 4 of width Wg is formed in a tread portion 3 of a tire, and in the present mode of embodiment a recessed portion 6 is provided in one wall surface 411 of the main groove 4 in a direction in which the width of the main groove 4 increases. The recessed portion 6 has a depth Dr, and similarly to the first mode of embodiment a flexible fence 5 having a thickness E is connected to the deepest section thereof, extending in the width direction of the main groove 4. Although this is not shown in the drawing, the flexible fence 5 is provided in such a way that there is a certain gap between itself and the bottom surface 413 of the main groove 4.

If as in the present mode of embodiment a recessed portion 6 is provided in one wall surface 411 (or 412) of the main groove 4 and a flexible fence 5 is connected to the recessed portion 6, then even if the flexible fence 5 is subjected to wear due to wear of the tread portion 3, there is no significant change in the bending stiffness of the flexible fence 5 and therefore there is almost no impact whereby the flexible fence 5 collapses less readily due to wear, inhibiting drainage within the main groove 4. Further, as discussed hereinabove localised significant bending of the flexible fence 5 occurs within the recessed portion 6, and thus the main groove 4 can be opened to a large extent, and it is therefore possible for drainage performance to be improved further while reducing the air column resonance sound.

It should be noted that as a variation it is also possible for example to provide recessed portions 6 in the bottom surface 413 as well as in one wall surface 411 (or 412) of the main groove 4 at any one or a plurality of the installation spacings P, and to connect flexible fences 5 such as those in the second mode of embodiment and the first mode of embodiment discussed hereinabove to each of the recessed portions 6, provided that the effect discussed hereinabove is exhibited. Further, it is also possible to provide flexible fences 5 and recessed portions 6 such as those in the second mode of embodiment discussed hereinabove, alternately or in suitable proportions, on one wall surface 411 and the other wall surface 412 of the main groove 4, using a flexible fence 5 installation spacing P such as that discussed hereinabove in the first mode of embodiment.

The main operational advantages of a pneumatic tire according to the second mode of embodiment of the present invention will now be described. The operational advantages of the pneumatic tire according to the present mode of embodiment are essentially the same as those of the first mode of embodiment discussed hereinabove, and the description here will mainly relate to operational advantages that are specific to the second mode of embodiment.

First, in the present mode of embodiment the configuration is such that a recessed portion 6 is formed in one wall surface 411 of the main groove 4 and a flexible fence 5 is connected to the recessed portion 6, and therefore the location at which the flexible fence 5 is connected to the main groove 4 can be set to a location that is deeper than the wall surface 411 (or 412) of the main groove 4, and therefore by arranging that a root section of the flexible fence 5 corresponding to said depth does not remain within the main groove 4, it is possible to suppress narrowing of the main groove 4 in the width direction of the groove.

Further, because the flexible fence 5 is connected to the recessed portion 6 in a location that is a depth of at least equal to 1.0 mm from the opening 62 of the recessed portion 6, it is possible to arrange that when the flexible fence 5 collapses due to hydrostatic pressure, the section thereof that bends significantly is located at a height that is equivalent to that of the wall surface 411 (or 412) of the main groove 4, or is located lower than the wall surface 411 (or 412) of the main groove 4. Therefore the cross-sectional area of the main groove 4 can be more reliably maintained in the event that the flexible fence 5 collapses due to hydrostatic pressure, and as a result drainage characteristics can be more reliably maintained.

Further, in the longitudinal direction of the main groove 4, the distance Lhrt from the flexible fence 5 to at least one edge portion (621 and/or 622) from among the edge portions 621, 622 of the opening 62 is at least equal to 1.25 mm and is at most equal to 120% of the height h of the flexible fence 5 when new, and therefore drainage characteristics can be maintained while a reduction in the air column resonance sound is achieved, by maintaining a region into which the flexible fence 5 can collapse, by arranging that when the flexible fence 5 collapses due to hydrostatic pressure, the section thereof that bends significantly is located within the recessed portion 6 between the location at which the flexible fence 5 is connected to the recessed portion 6 and the edge portion 621, 622 of the opening 62. Here, if the distance Lhrt is smaller than 1.25 mm then it becomes difficult for the flexible fence 5 to collapse sufficiently and drainage characteristics deteriorate. On the other hand, if the distance Lhrt is larger than 120% of the height h of the flexible fence 5 when new, the region in which the ground contact area of the tread 3 is reduced becomes larger, and thus various types of performance normally required of a tire deteriorate. Therefore, by arranging that the distance Lhrt is at least equal to 1.25 mm and is at most equal to 120% of the height h of the flexible fence 5 when new, it is possible to maintain drainage characteristics and to sustain various types of performance of the tire 1 while achieving a reduction in the air column resonance sound.

Further, because a recessed portion 6 is formed in one wall surface 411 (or 412) of the main groove 4 and a flexible fence 5 is connected to the recessed portion 6, it is possible for the configuration to be such that there is little variation in the bending stiffness of the flexible fence 5 due to wear of the tread 3, and thus drainage characteristics can be maintained more reliably over an extended period of time while achieving a reduction in the air column resonance sound.

A pneumatic tire according to a third mode of embodiment of the present invention will now be described based on FIG. 6.

FIG. 6 is a diagram illustrating schematically a tread portion of a pneumatic tire according to a third embodiment of the present invention. The essential configuration of the recessed portion 6 and the flexible fence 5 in the present mode of embodiment, for example the shape and dimensions thereof, is similar to that in the first mode of embodiment discussed hereinabove, and the description here will mainly relate to aspects of the configuration that differ from the first mode of embodiment discussed hereinabove.

As illustrated in FIG. 6, a main groove 4 of width Wg is formed in a tread portion 3 of a tire, and in the present mode of embodiment recessed portions 6 are provided in both wall surfaces 411, 412 of the main groove 4 in directions in which the width of the main groove 4 increases. The recessed portions 6 are formed respectively at opposing locations in the wall surfaces 411, 412. The recessed portions 6 have a depth Dr, and similarly to the first mode of embodiment flexible fences 5 having a thickness E are connected respectively to the deepest sections of the recessed portions 6. The flexible fences 5 have a height h/2 that is substantially half of that in the first mode of embodiment discussed hereinabove, and they extend at mutually opposing locations from the wall surfaces 411, 412 in the width direction of the main groove 4. The essential function of the flexible fences 5 is similar to that of the flexible fences 5 in the first mode of embodiment. (Hereinafter, these flexible fences 5 are referred to as 'flexible half fences'.) Although this is not shown in the drawing, each flexible half fence 5 is provided in such a way that there is a certain gap between itself and the bottom surface 413 of the main groove 4. The flexible half fences 5 are of a form whereby they oppose each other, they have substantially the same height h/2 in the width direction of the main groove, thickness E and length (corresponding to the width I in the flexible fence 5 of the first mode of embodiment) in the depth direction of the main groove 4, and they are provided in such a way that there is a certain gap between the flexible half fences 5.

If as in the present mode of embodiment recessed portions 6 are provided in both wall surfaces 411, 412 of the main groove 4 and flexible half fences 5 are connected to the recessed portions 6, then even if the flexible half fences 5 are subjected to wear due to wear of the tread portion 3, there is no significant change in the bending stiffness of the flexible fences 5 and therefore there is almost no impact whereby the flexible half fences 5 collapse less readily due to wear, inhibiting drainage within the main groove 4. Further, localised significant bending of the flexible half fences 5 occurs within the recessed portions 6, and thus the main groove 4 can be opened to a large extent, and it is therefore possible for drainage performance to be improved while the air column resonance sound is reduced. Further, because the bending stiffness of the flexible half fences 5 is relatively high, the side surfaces of the half fences predominantly on the tread footprint side can be made to wear more uniformly.

It should be noted that a variation it is also possible, provided that the effect discussed hereinabove is exhibited, for example to provide recessed portions 6 in the bottom surface 413 as well as in both wall surfaces 411, 412 of the main groove 4 at any one or a plurality of the installation spacings P, or in relation to sets of flexible half fences 5 and recessed portions 6 at the same location, to mutually offset in the longitudinal direction of the main groove 4 the recessed portions 6 in the two wall surfaces 411, 412 of the main groove 4, to arrange that the lengths or shapes of the flexible half fences 5 connected to the recessed portions 6 differ from each other, or to arrange that the flexible half fences 5 overlap in the longitudinal direction of the main groove 4.

Further, it is also possible to provide the flexible fences 5 and recessed portions 6 of the first mode of embodiment discussed hereinabove, the flexible fences 5 and recessed portions 6 of the third mode of embodiment, and/or the flexible fences 5 and recessed portions 6 of the second mode of embodiment discussed hereinabove, alternately or in suitable proportions, using a flexible fence 5 installation spacing P such as that discussed hereinabove in the first mode of embodiment.

The main operational advantages of a pneumatic tire according to the third mode of embodiment of the present invention will now be described. The operational advantages of the pneumatic tire according to the present mode of embodiment are essentially the same as those of the first mode of embodiment discussed hereinabove, and the description here will mainly relate to operational advantages that are specific to the third mode of embodiment.

First, in the present mode of embodiment the configuration is such that recessed portions 6 are formed in both wall surfaces 411, 412 of the main groove 4 and flexible half fences 5 are connected to the recessed portions 6, and therefore the locations at which the flexible fences 5 are connected to the main groove 4 can be set to locations that are deeper than the wall surfaces 411, 412 of the main groove 4, and therefore by arranging that root sections of the flexible fences 5 corresponding to said depths do not remain within the main groove 4, it is possible to suppress narrowing of the main groove 4 in the width direction of the groove.

Further, because the flexible half fences 5 are connected to the recessed portions 6 in locations that are a depth of at least equal to 1.0 mm from the openings 62 of the recessed portions 6, it is possible to arrange that when the flexible half fences 5 collapse due to hydrostatic pressure, the sections thereof that bend significantly are located at a height that is equivalent to that of the wall surfaces 411, 412 of the main groove 4, or are located lower than the wall surfaces 411, 412 of the main groove 4. Therefore the cross-sectional area of the main groove 4 can be more reliably maintained in the event that the flexible half fences 5 collapse due to hydrostatic pressure, and as a result drainage characteristics can be more reliably maintained.

Further, in the longitudinal direction of the main groove 4, the distance Lhrt from the flexible half fences 5 to at least one edge portion (621 and/or 622) from among the edge portions 621, 622 of the openings 62 is at least equal to 1.25 mm and is at most equal to 120% of the height h of the flexible half fences 5 when new, and therefore drainage characteristics can be maintained while a reduction in the air column resonance sound is achieved, by arranging that when the flexible half fences 5 collapse due to hydrostatic pressure, the sections thereof that bend significantly are located within the recessed portions 6 between the locations at which the flexible fences 5 are connected to the recessed portions 6 and the edge portions 621, 622 of the openings 62.

Further, because recessed portions 6 are formed respectively in substantially opposing locations in the opposing wall surfaces 411, 412 of the main groove 4, and two flexible half fences 5 are connected respectively to the recessed portions 6, it is possible for the configuration to be such that there is little variation in the bending stiffness of the half fences due to wear of the tread, and thus drainage characteristics can be maintained more reliably over an extended period of time while achieving a reduction in the air column resonance sound. Also, the bending stiffness of the flexible half fences 5 is relatively higher than that of a flexible fence configured in such a way that the main groove is blocked using a single fence, and therefore the side surfaces on the tread footprint 7 sides of the flexible half fences 5 can be made to wear more uniformly.

Particularly preferred modes of embodiment of the present invention have been described hereinabove, but the present invention may be modified and implemented in the form of various embodiments without limitation to the modes of embodiment shown in the drawings.

EXPLANATION OF THE REFERENCE CODES

1 Pneumatic tire
2 Ply
3 Tread portion
4 Main groove
41 Surface constituting main groove
411 Opposing wall surface of groove
412 Opposing wall surface of groove
413 Bottom portion of main groove
5 Flexible fence
51 Bottom portion of flexible fence (connecting portion between recessed portion 6 and bottom portion 61)
511, 512 Edge portions of bottom portion
6 Recessed portion
61 Bottom portion of recessed portion
62 Opening of recessed portion
621, 622 Edge portions of opening of recessed portion
63 Inclined portion
7 Tread footprint

The invention claimed is:

1. A pneumatic tire having a tread which has at least one main groove comprising a bottom surface and opposing first and second wall surfaces and a plurality of flexible fences which have a thickness E and are formed within the at least one main groove, and at least one ply which is disposed radially inward of the tread and which extends in the circumferential direction of the tire, wherein the abovementioned plurality of flexible fences extend within the abovementioned main groove so as to interrupt at least 70% of the cross-sectional area of the abovementioned main groove and are disposed with a spacing such that at least one flexible fence is present within the abovementioned main groove within a tread footprint when the tire is rolling, wherein a plurality of recessed portions having an opening which opens in the abovementioned main groove are formed in the bottom surface, the first wall surface and/or the second wall surface of the abovementioned main groove, and wherein the abovementioned plurality of flexible fences are connected respectively to the abovementioned plurality of recessed portions and extend into the abovementioned main groove through the openings of the abovementioned recessed portions, wherein the openings of the abovementioned recessed portions each have edge portions extending in the width direction of the main groove at locations that are separated in the direction in which the abovementioned main groove extends, and wherein, in the direction in which the abovementioned main groove extends, a distance Lhrt from the abovementioned flexible fence to at least one edge portion from among the abovementioned edge portions of the abovementioned opening is at least equal to 1.25 mm and is at most equal to 120% of a height h of the flexible fences when new.

2. The pneumatic tire according to claim 1, wherein the abovementioned flexible fences are connected to the abovementioned recessed portions in a location that has a depth of at least equal to 1.0 mm from the openings of the abovementioned recessed portions.

3. The pneumatic tire according to claim 1, wherein a bottom portion having a length Lrb in the direction in which the abovementioned main groove extends and a maximum depth Dr is formed in the deepest location in the abovementioned recessed portions, wherein the openings of the abovementioned recessed portions have a length Lrt in the direction in which the abovementioned main groove extends, and wherein the length Lrb of the bottom portion of the abovementioned recessed portions is shorter than the length Lrt of the opening of the abovementioned recessed portions.

4. The pneumatic tire according to claim 3, wherein the abovementioned flexible fences are connected to the bottom portion of the abovementioned recessed portions and the maximum depth Dr of the abovementioned bottom portion is at least equal to 1.0 mm.

5. The pneumatic tire according to claim 3, wherein the abovementioned flexible fences are connected at the deepest location in the abovementioned recessed portions.

6. The pneumatic tire according to claim 5, wherein the abovementioned recessed portions are formed in the bottom surface of the abovementioned main groove, and the abovementioned flexible fences are connected to the recessed portions.

7. The pneumatic tire according to claim 6, wherein the openings of the abovementioned recessed portions respectively have edge portions extending in the width direction of the main groove at locations that are separated in the direction in which the abovementioned main groove extends, and wherein the distance Lrt between the edge portions of the abovementioned openings in the direction in which the abovementioned main groove extends is at least equal to 2.5 mm and is at most equal to 240% of the height h of the flexible fences when new.

8. The pneumatic tire according to claim 7, wherein the length of the interval, measured in the radial direction of the tyre, between the deepest location in the abovementioned recessed portions and a radially outer surface of the outermost ply, in the radial direction of the tyre, is at least equal to 1.0 mm.

9. The pneumatic tire according to claim 5, wherein the abovementioned recessed portions are formed in one of the first and second wall surfaces of the abovementioned main groove, and the abovementioned flexible fences is connected to the recessed portions formed in the abovementioned one wall surface.

10. The pneumatic tire according to claim 9, wherein the abovementioned recessed portions are formed in substantially opposing locations on the first and second wall surfaces of the abovementioned main groove, the abovementioned flexible fences are formed by means of two half fences, and these half fences are connected respectively to the recessed portions formed in the abovementioned substantially opposing locations.

11. The pneumatic tire according to claim 8, wherein the thickness E of the abovementioned flexible fences are at least equal to 0.3 mm and at most equal to 1.0 mm.

12. The pneumatic tire according to claim 10, wherein the thickness E of the abovementioned flexible fences are at least equal to 0.3 mm and at most equal to 1.0 mm.

* * * * *